United States Patent
Pedersen et al.

(10) Patent No.: US 12,251,892 B2
(45) Date of Patent: Mar. 18, 2025

(54) SHEAR WEB MOULD SYSTEM COMPRISING VARIABLE MOULDING PLATES

(71) Applicant: LM WP PATENT HOLDING A/S, Kolding (DK)

(72) Inventors: Steven Hauge Pedersen, Kolding (DK); Kim Ansholm Rasmussen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 17/747,070

(22) Filed: May 18, 2022

(65) Prior Publication Data

US 2023/0256689 A1    Aug. 17, 2023

Related U.S. Application Data

(62) Division of application No. 15/523,268, filed on Apr. 28, 2017, now abandoned.

(51) Int. Cl.
*B29C 70/44* (2006.01)
*B29C 33/30* (2006.01)
(Continued)

(52) U.S. Cl.
CPC .......... *B29C 70/443* (2013.01); *B29C 33/308* (2013.01); *B29C 70/026* (2013.01);
(Continued)

(58) Field of Classification Search
CPC ... B29C 70/026; B29C 70/028; B29C 70/443; B29C 70/543; B29K 2105/08; B29K 2105/20; B29L 2031/085
See application file for complete search history.

(56) References Cited

U.S. PATENT DOCUMENTS 7,497,981 B2 * 3/2009 Graham ................ B29C 70/443
                                                                425/389
9,782,944 B2 * 10/2017 Martin ................ D06M 15/507
(Continued)

FOREIGN PATENT DOCUMENTS

DE    102009030860 A1    2/2010
DE    10 2011 082 664 A1    3/2013
(Continued)

OTHER PUBLICATIONS

Machine Translation of WO 2013/037466 (Year: 2024).*
(Continued)

*Primary Examiner* — Russell E Sparks
(74) *Attorney, Agent, or Firm* — Nath, Goldberg & Meyer; Jerald L. Meyer; Tanya E. Harkins (57) ABSTRACT

A shear web mould system for manufacturing a wind turbine component in form of an I-shaped shear web having a web body and a first web foot flange at a first end of the web body and a second web foot flange at a second end of the web body is described. The system comprises a central moulding portion for forming at least a part of the web body, a first moulding plate for forming at least a part of the first web foot flange, and a second moulding plate for forming at least a part of the second web foot flange. The angles of the first moulding plate and the second moulding plate relative to the central moulding portion are adjustable.

8 Claims, 5 Drawing Sheets

(51) Int. Cl.
    *B29C 70/02*     (2006.01)
    *B29C 70/54*     (2006.01)
    *B29D 99/00*     (2010.01)
    *B29K 105/08*     (2006.01)
    *B29K 105/20*     (2006.01)
    *B29L 31/08*     (2006.01)

(52) U.S. Cl.
    CPC .......... *B29C 70/028* (2013.01); *B29C 70/541* (2013.01); *B29C 70/543* (2013.01); *B29D 99/0003* (2013.01); *B29K 2105/08* (2013.01); *B29K 2105/20* (2013.01); *B29L 2031/085* (2013.01); *Y02P 70/50* (2015.11)

(56) References Cited

U.S. PATENT DOCUMENTS

| | | |
|---|---|---|
| 2006/0231981 A1 | 10/2006 | Lee et al. |
| 2008/0072527 A1 | 3/2008 | Kondo |
| 2009/0025448 A1 | 1/2009 | Krogager |
| 2011/0274553 A1 | 11/2011 | Stiesdal |
| 2012/0061871 A1 | 3/2012 | Thaden et al. |

FOREIGN PATENT DOCUMENTS

| | | | |
|---|---|---|---|
| DE | 10 2012 223 707 A1 | 6/2014 | |
| DK | 200501539 L | 5/2007 | |
| EP | 1946915 A1 | 7/2008 | |
| FR | 2339472 A1 | 8/1977 | |
| WO | WO-2013037466 A1 * | 3/2013 | ............. B29C 33/48 |

OTHER PUBLICATIONS

Indian Office Action dated Nov. 6, 2020 corresponding to application No. 201747016176.
International Search Report dated Jul. 24, 2015 issued in corresponding International Application No. PCT/EP2014/073382.
"Opulent Mitsui Chemicals Tohcello"; Nov. 20, 2011; https://www.mc-tohcello.co.jp/english/product/industry/tpx.html.

* cited by examiner

SHEAR WEB MOULD SYSTEM COMPRISING VARIABLE MOULDING PLATES

CROSS-REFERENCE TO RELATED APPLICATIONS

This application is a divisional application of U.S. application Ser. No. 15/523,268, filed on Apr. 28, 2017, which was a National Phase Application filed under 35 U.S.C. § 371 as the national stage of PCT Application No. PCT/EP2014/073382, filed on Oct. 30, 2014, the content of each of which is hereby incorporated by reference in its entirety.

FIELD OF THE INVENTION

The present invention relates to a shear web mould system for manufacturing a wind turbine component in form of an I-shaped shear web having a web body and a first web foot flange at a first end of the web body and a second web foot flange at a second end of the web body. The invention further relates to a method of manufacturing a wind turbine component in form of an I-shaped shear web via the shear web mould system.

BACKGROUND OF THE INVENTION

Wind turbine blades are often manufactured according to one of two constructional designs, namely a design where a thin aerodynamic shell is glued or otherwise bonded onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure, and prevent excessive bending or buckling. Some blade designs use shear webs formed from beam members having I- or C-shaped cross-sections, the members having a main body with load-bearing flanges extending therefrom at opposed ends of the main body.

One method of manufacturing such I- or C-webs is through the provision of a sandwich panel body to which layers of fibre material are applied at the opposed ends in the shape of the desired flanges, the fibre material being infused with a resin and subsequently cured to form rigid flanges.

It is well-known to manufacture such shear webs in a suitably shaped mould structure, wherein a C-web can be manufactured using a relatively simple U-shaped mould, where the sandwich panel body extends between opposed walls of the mould structure, with the flanges formed through the layup of fibre material against said walls.

Similarly, an I-web can be manufactured using a mould having a central support bounded by flexible support members on either side to define an adjustable channel between the flexible support members and the opposed mould walls. In this situation, the sandwich panel body is arranged on the central support, while the adjustable channel is arranged to receive fibre layers to form the flanges on a first side of the panel body, with the flanges on the second side of the panel body formed by the layup of fibre material against the opposed mould walls.

An example of such manufacturing systems can be seen in International Patent Application Publication No. WO 2013/037466 A1 and International Patent Application Publication No. WO 2014/095870 A1. However, these systems have the disadvantage of the necessity of removable inserts in order to be able to remove the I-web from the system. Further, the layup is rather complicated, since the fibre layers have to be folded around the inserts. This may provide wrinkles to the fibre layup.

In addition to the above, shear webs having such resin-infused fibre-based flanges can be an area of interest for the prevention of structural faults and cracks, due to the relatively large forces transferred through said flanges.

Further, the mould systems for manufacturing the shear webs are custom made for each blade so that the height of the shear web and the angles of the web foot flanges are specifically designed for a particular wind turbine blade model or type. Thus, a separate mould system is needed for each wind turbine blade type or model, and the mould systems are bulky and expensive.

It is an object of the invention to provide an alternative system and method for the manufacture of wind turbine blade components in form of shear webs, which provides for increased ease of manufacture and advantageously also with a reduced risk of structural failure.

SUMMARY OF THE INVENTION

This is according to a first aspect obtained by a shear web mould system for manufacturing a wind turbine component in form of an I-shaped shear web having a web body and a first web foot flange at a first end of the web body and a second web foot flange at a second end of the web body, wherein the system comprises:
 a central moulding portion for forming at least a part of the web body, a first moulding plate for forming at least a part of the first web foot flange, and a second moulding plate for forming at least a part of the second web foot flange, wherein the angles of the first moulding plate and the second moulding plate relative to the central moulding portion are adjustable.

By having variable moulding, it is possible to use the same mould system for manufacturing a plurality of different shear web types and to customise the angles of the web foot flanges to a particular geometry of the aerodynamic shell of the wind turbine blade. Further, the system allows for small adjustments of the angles, whereby it is possible to empirically adjust the angular position of the moulding plates such that a better attachment surface is achieved for the web foot flanges to the shell part of the particular wind turbine blade model or type.

It is recognised that a shear web is an elongated element. Accordingly, the shear web mould system is also elongated. Further, it is clear that the adjustable moulding plates, which are arranged at transverse sides of the mould system, may be variably adjusted in a longitudinal direction of the mould system. Thereby, it is possible to set the angles of the moulding plates to a first angle along a first section of the mould system, and set the angles of the moulding plates to a second angle along a second section of the mould system.

It is recognised that the mould system may be sectionised, in particular in the longitudinal or spanwise direction of the mould system. Thus, one section may manufacture a first longitudinal section of the shear web (or spar beam) and another section may manufacture a second longitudinal section of the shear web. The sectionised mould system may preferably be assembled so that the shear web may be manufactured as a unitary structure.

By substantially I-shaped is meant that the shear web has a shear web body and a first web foot flange at a first end of the web body, where a first flange part extends from a first side of the web body and a second flange part extends from a second side of the web body, and further a second web foot flange at a second end of the web body, where a first flange part extends from a first side of the web body and a second flange part extends from a second side of the web body.

According to a preferred embodiment, the distance between the first moulding plate and the second moulding plate is translationally adjustable, or in other words the distance between the two moulding plates may be varied. Thereby, it is further possible to vary the width or height of the shear web manufactured via the mould system. This also allows for small adjustments of the width or height, whereby it is possible to empirically adjust the distance between the two web foot flanges such that a more controlled thickness of glue bonds between the web foot flanges and the shell part of the wind turbine blade may be achieved.

In a first embodiment, the distance between the first moulding plate and the central moulding portion is translationally adjustable and/or the distance between the second moulding plate and the central moulding portion is translationally adjustable. In practice this will often be achieved by the central portion being stationary, e.g. stationary supported by a table, and where the moulding plates may be moved relative to the stationary portion.

In a second embodiment, a width of the central moulding portion is variable, e.g. via a telescoping arrangement. Thereby, parts of the central portion may be moved together with one of the moulding plate.

In an advantageous embodiment, the mould system comprises a lower mould part comprising the first moulding plate, the central moulding portion, and the second moulding plate.

In another advantageous embodiment, the system further comprises a flexible cover, which covers the lower mould part. The flexible cover is adapted to provide a smooth continuous surface so that fibre reinforcement material, core material, and possible insert may be arranged on top of the flexible cover. The flexible cover may cover possible gaps between the central portion and the moulding plates.

In yet another advantageous embodiment, the mould system comprises a lower mould part having a raised central portion. The raised portion may for instance be part of a support table for layup of fibre reinforcement material and other parts of the shear web.

In one embodiment, the mould system further comprises a first removable insert at a first side of the raised central portion and/or a second removable insert at a second side of the raised central portion. The first removable insert may comprise a first external side part facing away from the central portion, and the second removable insert comprises a second external side part facing away from the central portion. The first external side part and the second external side part are converging from an upper part to a lower part of the lower mould part. The removable inserts allow web foot flanges to be manufactured with converging flanges, whereby the removable inserts may be removed first, after which the finished shear web may be removed from the mould system after manufacture. The removable inserts may for instance be made of a silicone material.

In another embodiment, the first moulding plate and the second moulding plate are arranged so as to form an outer part of the first web foot flange and the second web foot flange, respectively. The outer parts of the web foot flanges are the parts that are attached to an inner side of the shell part of the wind turbine blade. Thus, the moulding plates may be arranged as external plates in the mould system.

In an advantageous embodiment, the angle of the first moulding plate is adjustable via a first hinge mechanism connected to the first moulding plate, and the angle of the second moulding plate is adjustable via a second hinge mechanism connected to the second moulding plate. This provides for a particular simple solution for varying the angle of the moulding plates. The hinge mechanism may for instance be connected to a surface of a support table, whereby the angle of the moulding plates may be varied relative to said surface of the support table. Preferably, the hinge mechanism is also arranged translationally relative to the central portion of the mould system. This may for instance be achieved by the hinge mechanism being able to slide along the support table, e.g. via a slot in the hinge mechanism.

In another advantageous embodiment, the angle of the first moulding plate is adjustable via at least one translational stage, and the angle of the first moulding plate is adjustable via at least one translational stage. The translational stage may for instance be a spindle, a turnbuckle, or a hydraulic or pneumatic piston. This provides another simple solution for varying the angle of the moulding plate. The translational stage may for instance be arranged between the central portion and the moulding plate of the mould system. Alternatively, the translational stage may be arranged between a stationary part, e.g. a support table, and the moulding plate.

In yet another advantageous embodiment, the first moulding plate and/or the second moulding plate are adjustable via at least two translational stages. Thereby, it is possible to vary both the position and the angle of the moulding plates.

In an alternative embodiment, the first moulding plate and the second moulding plate are arranged so as to form an inner part of the first web foot flange and the second web foot flange. The inner parts of the web foot flanges are the parts that face away from the blade shell, when the shear web is attached to the shell part of the wind turbine blade. Accordingly, the moulding plate may be arranged so that the fibre layers arranged in the mould system cover both the moulding plates and the central portion of the mould system.

The mould system may further comprise an upper mould part having a central portion and a first side portion for forming an inner part of the first web foot flange and a second side portion for forming an inner part of the second web foot flange. The first side part is arranged at a first side of the central portion and extends upwards from the first end. Similarly, the second side part is arranged at a second side of the central portion and extends upwards from the first end. The side parts are preferably oriented so that they are aligned with the moulding plates, which are part of the lower mould part. Accordingly, the first side part and the second side part of the upper mould part may for instance be converging from the central portion of the upper mould part.

Further, the angle of the first side part and/or the angle of the second side part are adjustable relative to the central portion of the upper mould. The distance between the first side part and the second side part may of course also be translationally adjustable.

According to a second aspect, the invention provides a method for manufacturing a wind turbine blade component in form of an I-shaped shear web by use of a shear web mould system according to any of the aforementioned embodiments, wherein the method comprises the steps of:
 a) arranging a fibre-reinforcement material in a mould cavity formed by at least the central portion, the first moulding plate, and the second moulding plate of the shear web mould system,
 b) supplying resin to the mould cavity, and
 c) curing or hardening the resin in order to form said wind turbine blade component.

In a first advantageous embodiment, step a) comprises the step of arranging a number of fibre layers that cover the first moulding plate, the central portion, and the second moulding plate.

In a preferred embodiment, a core material of low density, such as balsawood, foamed polymer or the like, is arranged in the central part of the lower web mould part. Thus, the web body of the shear web may be formed as a sandwich construction having the fibre-reinforcement material as skin layer(s).

According to an advantageous embodiment, at least a first insert is arranged at the first end of the lower web part, wherein said first insert is adapted to provide a gradual transition from the web body to the first web foot flange. Advantageously also a first additional insert is arranged at the second end of the lower web part in order to provide a gradual transition from the web body to the second web foot flange.

According to another advantageous embodiment, a second insert is arranged at the first end of the lower web part, wherein said first insert is adapted to provide a gradual transition from the web body to another part the first web foot flange. The first insert may for instance be provided at a first side of the core material and the second insert at a second side of the core material.

The first insert and/or the second insert may advantageously be substantially wedge shaped. Thus, the insert may have an overall triangular appearance. In an advantageous embodiment, the inserts have a rounded outer surface, which the first fibre layers and the second fibre layers, respectively, may abut so that a round transition is obtained from the web body to the first web foot flange. In principle, the transition may also be obtained by a single insert.

The shear web will preferably have similar inserts at the transition between the web body and the second web foot flange.

The insert(s) may be made of a core material, such as balsawood or foamed polymer. It may also be made of a fibre-reinforced polymer material and may be a pultruded or extruded element.

The fibre-reinforcement material is preferably glass fibres. But it may also be carbon fibres, aramid fibres, hemp fibres or the like.

In a preferred embodiment, at least one vacuum bag is arranged on the shear web mould system in order to form the mould cavity. Accordingly, it is seen that the mould cavity is preferably obtained by sealing a vacuum bag against the web mould parts.

According to another preferred embodiment, the mould cavity prior to supplying the 35 resin is evacuated by use of a vacuum source. Thus, it is seen that the shear web may be manufactured via a Vacuum Assisted Resin Transfer Moulding (VARTM) process.

In principle, it is also possible to use RTM, where resin is injected into the mould cavity by use of an over-pressure.

The resin is preferably injected into the mould cavity, e.g. by drawing the resin in via the vacuum or under-pressure. However, it is in principle also possible to use prepreg material for the first fibre layers and/or the second fibre layers, in which case the resin can be supplied together with the fibre layers, or a combination of both approaches.

There is further provided a method of manufacture of at least a part of a wind turbine blade comprising manufacturing at least one wind turbine blade component in the form of an I-web as described above, and joining said at least one wind turbine blade component to a second component to form at least a part of a wind turbine blade.

There is further provided a wind turbine blade component in the form of an I-web manufactured according to the above-described method.

There is further provided a wind turbine blade comprising a wind turbine blade component as described above.

There is further provided a wind turbine comprising at least one wind turbine blade as described above.

DESCRIPTION OF THE INVENTION

The invention is explained in detail below with reference to an embodiment shown in the drawings, in which.

DETAILED DESCRIPTION

Figure 1:
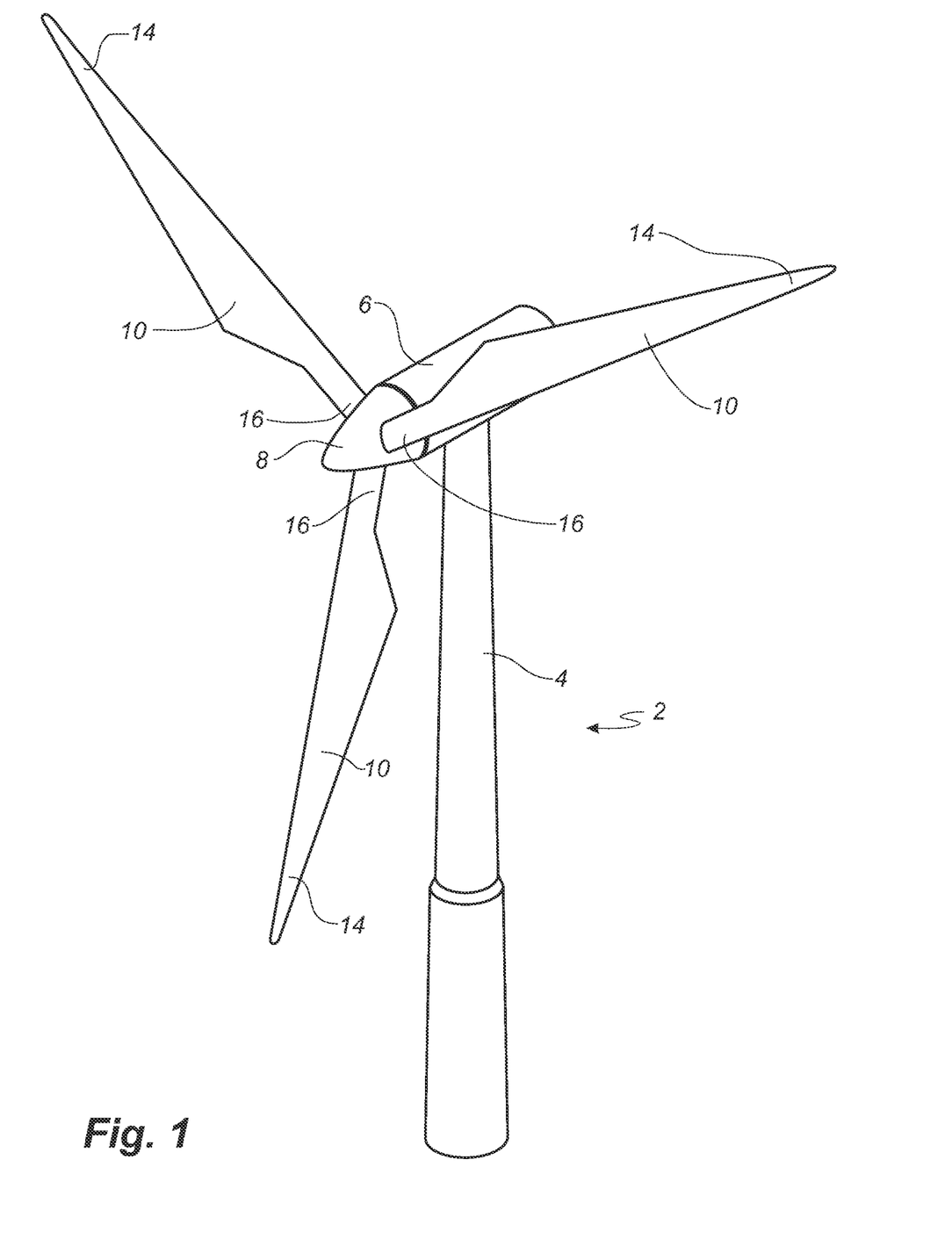
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the 25 hub 8. The rotor has a radius denoted R.

Figure 2:
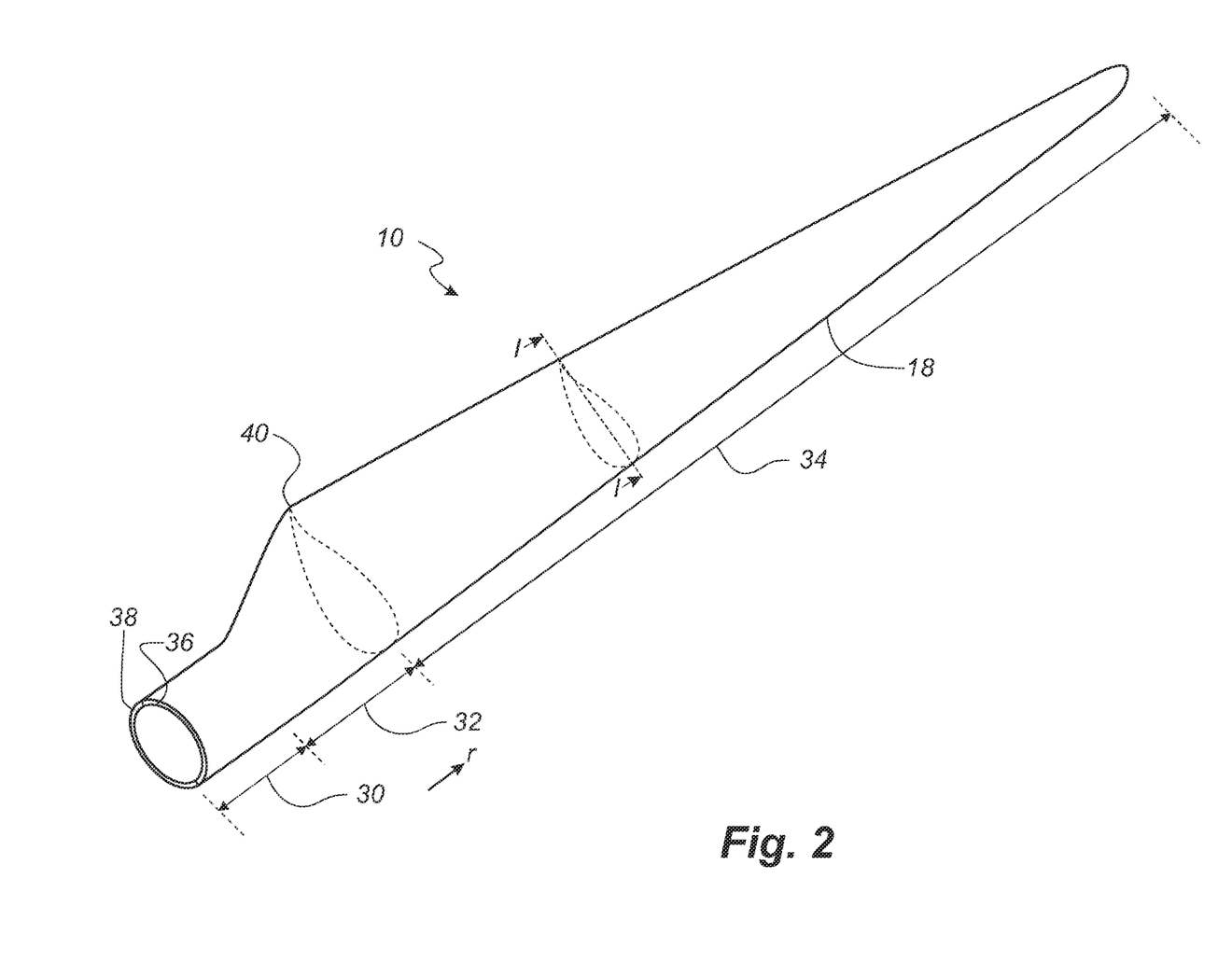
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a 30 transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
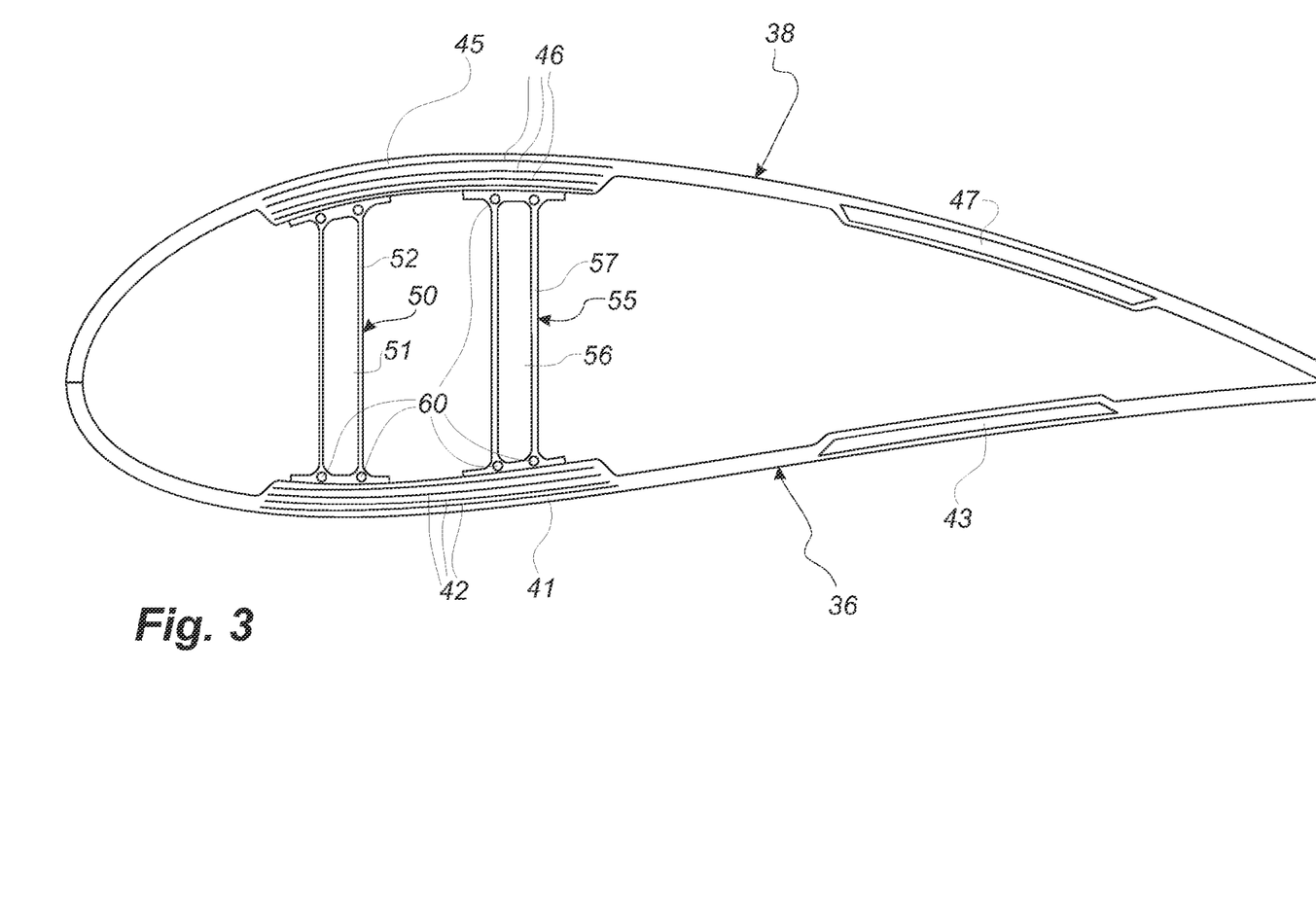
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, according to the invention, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4:
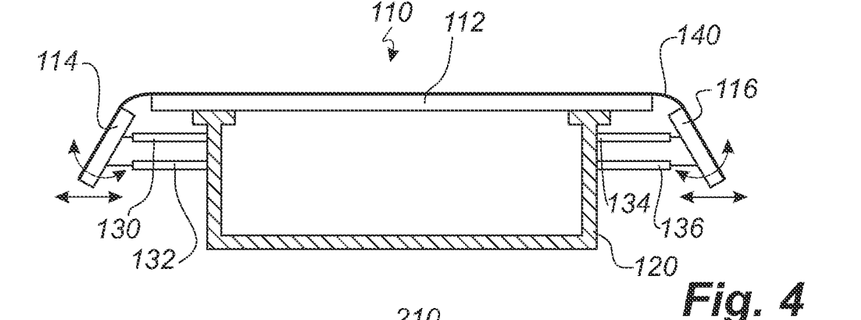
FIG. 4 shows a schematic view of a cross-section of a first embodiment of a lower mould part according to the invention.

FIG. 4 shows a first embodiment of a lower mould part 110 of a shear web mould system according to the invention. The lower mould part comprises a central moulding portion 112 for forming at least a part of a web body of a shear web, a first moulding plate 114 for forming at least a part of a first web foot flange, and a second moulding plate 116 for forming at least a part of a second web foot flange. A flexible cover 140 covers at least parts of the first moulding plate 114, the central moulding portion 112, and the second moulding plate 116 such that a continuous layup and moulding surface is provided between the three parts.

The central moulding portion is supported by a support table 120. The first moulding plate 114 is supported by two translational stages in form of a first linear actuator 130 and a second linear actuator 132, which are connected between the first moulding plate 114 and a stationary part of the support table 120. Similarly, the second moulding plate 116 is supported by two translational stages in form of a first additional linear actuator 134 and a second additional linear actuator 136, which are connected between the second moulding plate 116 and a stationary part of the support table 120. The linear actuators may for instance be spindles, turnbuckles, or hydraulic or pneumatic pistons.

The angle of the first moulding plate 114 may be varied relative to the central moulding portion 112 by translating one of the linear actuators 130, 132. Thereby, it is possible to vary the angle of the web foot flange and thus customise the web foot flange to a particular geometry of the aerodynamic shell of the wind turbine blade. By translating both linear actuators 130, 132, it is possible to translationally move the first moulding plate 114 relative to the central moulding portion 112. Similarly, the angle and relative position of the second moulding plate 116 may be varied relative to the central moulding portion 112 by translating the additional linear actuators 134, 136.

Overall, it is seen that the lower mould part 110 provides a mould system, where the angle of the two web foot flanges may be varied, and where the distance between the first moulding plate 114 and the second moulding plate 116 may be varied, whereby it is further possible to vary the width or height of the shear web manufactured via the mould system.

Figure 5:
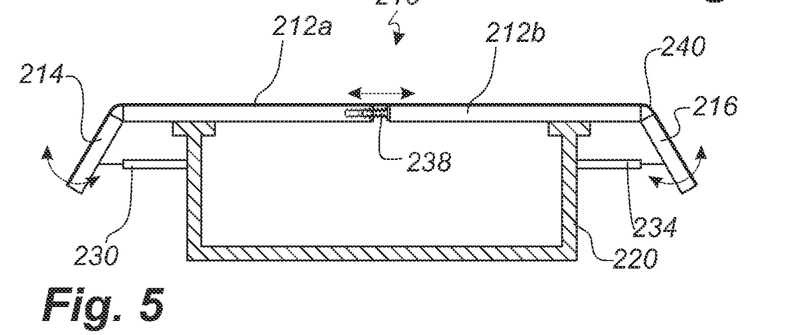
FIG. 5 shows a schematic view of a cross-section of a second embodiment of a lower mould part according to the invention.

FIG. 5 shows a first embodiment of a lower mould part 210 of a shear web mould system according to the invention. The lower mould part 210 comprises a central moulding portion 212 for forming at least a part of a web body of a shear web, a first moulding plate 214 for forming at least a part of a first web foot flange, and a second moulding plate 216 for forming at least a part of a second web foot flange. The central moulding portion is divided into a first central section 212a and a second central section 212b, and the two parts may be moved relative to each other via a translational stage 238, such as a spindle or a telescoping arrangement. A flexible cover 240 covers at least parts of the first moulding plate 214, the central sections 212a, 212b, and the second moulding plate 216 such that a continuous layup surface is provided between the three parts.

The two central sections 212a, 212b are supported by a support table 220. The first moulding plate 214 is supported by a translational stage in form of a first linear actuator 230, which is connected between the first moulding plate 214 and a stationary part of the support table 220. Similarly, the second moulding plate 216 is supported by a translational stage in form of a first additional linear actuator 234, which is connected between the second moulding plate 216 and a stationary part of the support table 220. The linear actuators may for instance be spindles, turnbuckles, or hydraulic or pneumatic pistons.

The angle of the first moulding plate 214 may be varied relative to the central moulding portion by translating the first linear actuator 230. Similarly, the angle of the second moulding plate 216 may be varied relative to the central moulding portion by translating the additional first linear actuators 234. The distance between the first moulding plate 214 and the second moulding plate 216 may be varied via the linear actuator 238.

Overall, it is seen that the lower mould part 210 provides a mould system, where both the angle of the two web foot flanges and the width or height of a shear web manufactured via the mould system may be varied.

Figure 6:
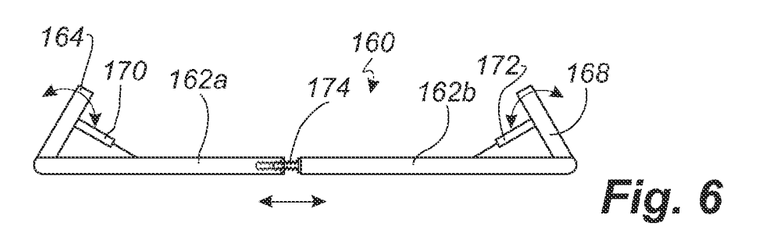
FIG. 6 shows a schematic view of a cross-section of a first embodiment of an upper mould part according to the invention.

FIG. 6 shows an embodiment of an upper mould part 160 of a shear web mould system according to the invention. The upper mould part 160 comprises a central moulding portion 162 for forming at least a part of a web body of a shear web, a first moulding plate 164 for forming at least a part of a first web foot flange, and a second moulding plate 166 for forming at least a part of a second web foot flange. The central moulding portion is divided into a first central section 162a and a second central section 162b, and the two parts may be moved relative to each other via a translational stage 174, such as a spindle or a telescoping arrangement.

The first moulding plate 164 is supported by a translational stage in form of a first linear actuator 170, which is connected between the first moulding plate 164 and the first central portion 162a. Similarly, the second moulding plate 168 is supported by a translational stage in form of a first additional linear actuator 172, which is connected between the second moulding plate 168 and the second central portion 162b. The linear actuators may for instance be spindles, turnbuckles, or hydraulic or pneumatic pistons.

The angle of first moulding plate 164 may be varied relative to the central moulding portion by translating the first linear actuators 170. Thereby, it is possible to vary the angle of the web foot flange and thus customise the web foot flange to a particular geometry of the aerodynamic shell of the wind turbine blade. Similarly, the angle of the second moulding plate 168 may be varied relative to the central moulding portion by translating the first additional linear actuator 172.

Figure 7:
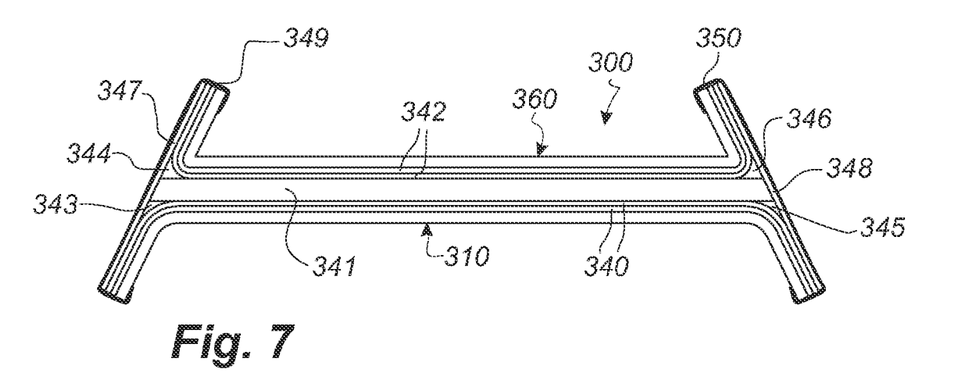
FIG. 7 shows a schematic view of a cross-section of a layup utilising a lower and an upper mould part.

FIG. 7 shows a schematic cross-section of a layup utilising a shear web mould system 300 comprising a lower mould part 310 and an upper mould part 360 similar to the embodiments shown in FIGS. 4-6. For simplicity, the lower mould part 310 and the upper mould part 360 are shown without the means for varying the angular position of the moulding plates of the mould parts 310, 360.

The lower web mould part 310 has a moulding surface, which defines an outer part of a shear web manufactured via the shear web moulding system. The moulding surface comprises a central portion, which is substantially flat, and which is utilised to form a web body of the shear web. Further, the lower web mould part 310 comprises a first moulding plate at a first side end of the lower web mould part 31, the first moulding plate having a first downwardly extending moulding surface portion. Similarly, the lower web mould part 310 comprises a second moulding plate at a second side end of the lower web mould part 310, the second side part having a second downwardly extending moulding surface portion. The moulding plates are diverging from the central portion of the lower web mould part 310.

A number of first fibre layers 340 are arranged on top of the lower web mould part 310 and cover the central portion and the downwardly extending moulding plates. The first fibre layers 340 form part of an outer skin of the finished shear web. Due to the design of the lower web mould part 310, the first fibre layers 340 may simply be draped over the concave moulding surface of the lower web mould 310 and do not need to be folded around side flanges. The first fibre layers 340 will simply comply with the moulding surface of the lower web mould 310.

A core material 341, such as balsawood or foamed polymer, is arranged on top of the first fibre layers 340 in the central portion of the lower web mould part 310. Thus, the web body of the shear web may be formed as a sandwich construction having the first fibre layers as a first skin and second fibre layers as a second skin. Further, a first insert 343 may be arranged at the first side end of the lower web part 310 and at a first side of the core material 341. The first insert 343 may have a shape so as to provide a gradual transition from the web body to a first web foot flange. Similarly, a second insert 345 may be arranged at the second side end of the lower web part 310 and at the first side of the core material 341. The second insert 345 may have a shape so as to provide a gradual transition from the web body to a second web foot flange.

A number of second fibre layers 342 are arranged on top of the core material 341, and an upper web mould part 360 is arranged on top of the second fibre layers 342. The upper web mould part 360 has a moulding surface with a central portion, which is substantially flat, a first upwardly extending moulding plate at a first side end of the upper web mould part 360, and a second upwardly extending moulding plate at a second side end of the upper web mould part 360. The first and the second moulding plates are converging from the central portion of the upper web mould part 360.

The central portion of the upper web mould part 360 preferably has a width equal to or slightly less than the width of the central portion of the lower web mould part 310. Further, the two mould parts 310, 360 are preferably arranged so that the downwardly extending moulding surface portions are aligned with the upwardly extending moulding surface portions, respectively.

The ends of the second fibre layers 342 are wrapped against the upwardly extending moulding surface portions. Further, a first additional insert 344 may be arranged at the first side end of the lower web mould part 310 and at a second side of the core material 341. The first additional insert 344 may have a shape so as to provide a gradual transition from the web body to a first web foot flange. Similarly, a second additional insert 346 may be arranged at the second side end of the lower web part 310 and at the second side of the core material 341. The second additional insert 346 may have a shape so as to provide a gradual transition from the web body to a second web foot flange. Additionally, a number of additional first fibre layers 347 may be provided for the first web foot flange, and a number of additional second fibre layers 348 may be provided for the second web foot flange. The additional fibre layers 347, 348 may form the bonding surfaces of the web foot flanges.

A first outer mould part in form of a flexible vacuum bag 349 is sealed against the lower web mould part 310 and the upper web mould part 360 at a first side of the mould parts 310, 360. Similarly, a second outer mould part in form of a flexible vacuum bag 350 is sealed against the lower web mould part 310 and the upper web mould part 360 at a second side of the mould parts 310, 360. Thus, a mould cavity is formed between the lower web mould part 310, the upper web mould part 360, and the two vacuum bags 349, 350. It is also possible to use a single vacuum bag only. Further, it is possible to use rigid outer mould parts for forming the mould cavity at the web foot flanges.

In a next step, not shown, a vacuum source is connected to the mould cavity, and the mould cavity is evacuated by use of the vacuum source. The mould cavity is further connected to a resin source, and liquid resin is injected into the mould cavity so as to wetting the fibre material and the core material. Thus, it is seen that the shear web is preferably manufactured via a Vacuum Assisted Resin Transfer Moulding (VARTM) process. The resin is preferably injected into the mould cavity, e.g. by drawing the resin in via the vacuum or under-pressure. However, it is in principle also possible to use prepreg material for the first fibre layers and/or the second fibre layers, in which case the resin can be supplied together with the fibre layers. It is also possible to apply a combination of the two approaches, i.e. the use of prepreg material and additional resin injected into the mould cavity.

The system may also be combined with external moulding plates, which form exterior parts of the web foot flanges, whereby it is possible to obtain straighter bonding surfaces for the web foot flanges.

Figure 10:
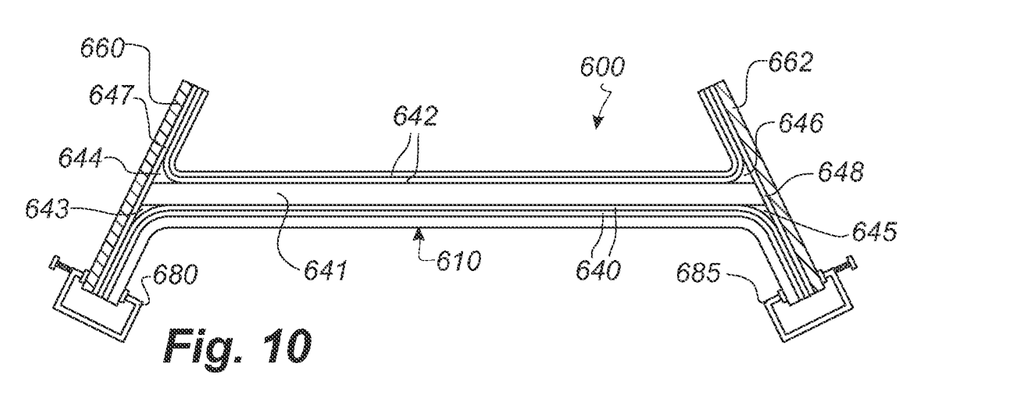
FIG. 10 shows a schematic view of a cross-section utilising a lower mould part and external moulding plates.

Further, the invention also provides a shear web mould system utilising a lower web mould part only. Such a shear web mould system 600 is shown in FIG. 10, where like reference numerals refer to like parts of the embodiment shown in FIG. 7. Therefore, only the differences between the two systems are described. For simplicity, the lower web mould part 610 is shown without the means for varying the angular position of the moulding plates of the lower web mould part 610.

Instead of using an upper web mould part, the shear web mould system 600 comprises a first external moulding plate 660 for forming an outer surface of a first web foot flange of the shear web, and a second external moulding plate 662 for forming an outer surface of a second web foot flange of the shear web.

Once the first fibre reinforcement layers 640 making up the first skin of the shear web body and the first sides of the web foot flanges are arranged on top of the lower web mould part 610, the first external moulding plate 660 is clamped against the first fibre layers 640 and the first internal moulding plate of the lower web mould part 610 by use of a first clamp 680. Similarly, the second external moulding plate 662 is clamped against the first fibre layers 640 and the second internal moulding plate of the lower web mould part 610 by use of a second clamp 685.

The second fibre layers 642 making up the second skin of the shear web body and the second sides of the web foot flanges may be wrapped around a top part of the external moulding plates 680, 685, or they may be retained against the moulding surfaces of the two plates by retaining means, such as a tackifier, a clamp, or magnets.

The two external moulding plates 680, 685 are preferably relatively flexible in the longitudinal direction so that they can be twisted or bended to follow the angles of the internal moulding plates of the lower web mould part 610. Since the external moulding plates 680, 685 are clamped flat against the internal moulding plates, the external moulding plates will automatically follow the angles of the internal moulding plates and accordingly, the moulding surfaces for moulding the second sides of the web foot flanges will also automatically have the correct angle.

Once the fibre material 640, 642, 647, 648, core material 641, and possible inserts 643, 644, 645, 646 have been arranged, a vacuum foil (not shown) is arranged on top of the material and the shear web mould system 600, and in a next step, not shown, a vacuum source is connected to the mould cavity, and the mould cavity is evacuated by use of the vacuum source. The mould cavity is further connected to a resin source, and liquid resin is injected into the mould cavity so as to wet the fibre material and the core material.

It is also contemplated that the lower web mould part 610 may comprise first lower lips at the sides of the lower web mould part, where the lips may define end sections of the first sides of the web foot flanges and/or which may be used for carrying the external web foot flanges. In such a setup, it is not necessary to use the clamps 680, 685.

The invention has so far been described in relation to a shear web mould system having a lower web mould part with diverging moulding plates and an upper web mould part with converging moulding plates, and where the moulding plates form inner parts of the web foot flanges. However, the invention is also applicable for conventional web mould systems, where an external moulding plate is used for forming an exterior part of the web foot flanges.

Figure 8:
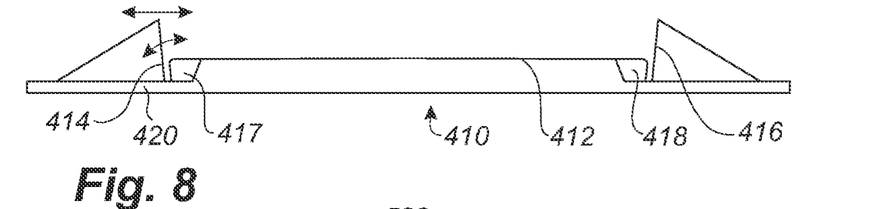
FIG. 8 shows a schematic view of a cross-section of a shear web mould system having external mould plates.

Such a system is illustrated in FIG. 8, which shows a lower web mould part 410. The lower web mould part 410 comprises a support table 420, which has a raised central moulding portion 412 for forming a shear web body, a first moulding plate 414 for forming a first web foot flange at a first end of the web body, and a second moulding plate 416 for forming a second web foot flange at a second end of the shear web body. The two moulding plates 414, 416 have moulding surfaces that shape an exterior surface of the web foot flanges.

A first removable insert 417 is arranged at a first side of the raised central moulding portion 412, and a second removable insert 418 is arranged at a second side of the raised central moulding portion 412. The first removable insert 417 comprises a first external side part facing away from the central moulding portion 412, and the second removable insert 418 comprises a second external side part facing away from the central moulding portion 412, wherein the first external side part and the second external side part are converging from an upper part to a lower part of the lower mould part. Similarly, the moulding surfaces of the moulding plates 414, 416 are converging from a top part to a bottom part of the moulding plates 414, 416. The removable inserts may for instance be made of a silicone material.

The moulding plates 414, 416 are translationally adjustable relative to the central moulding portion 412, and further the angles of the first moulding plate 414 and the second moulding plate 414 are adjustable relative to the central moulding portion 412, which is illustrated by the shown arrows. In another embodiment, not shown, the width of the central moulding portion is adjustable, which may be achieved by having two central moulding portions with adjustable spacing. The spacing may be filled with an insert, e.g. a silicone insert similar to the two removable inserts 417, 418. It is also possible to arrange a flexible cover on top of the lower mould part (similar to the embodiments shown in FIGS. 4 and 5) in order to form a continuous moulding surface.

Fibre-reinforcement material, inserts, and core material may be arranged on top of the lower mould part similar to the embodiment shown in FIG. 7. However, the first fibre layers are wrapped around the removable inserts. This setup does not need an upper web mould part, and a vacuum bag may simply be arranged on top of the material and sealed against the lower web mould part 410 in order to form a mould cavity, which may then be evacuated after which a resin may be injected into the mould cavity and cured or hardened in order to form the shear web. The removable inserts 417, 418 may be removed prior to de-moulding the shear web, whereby the shear web may simply be lifted from the lower web mould part 410.

Figure 9:
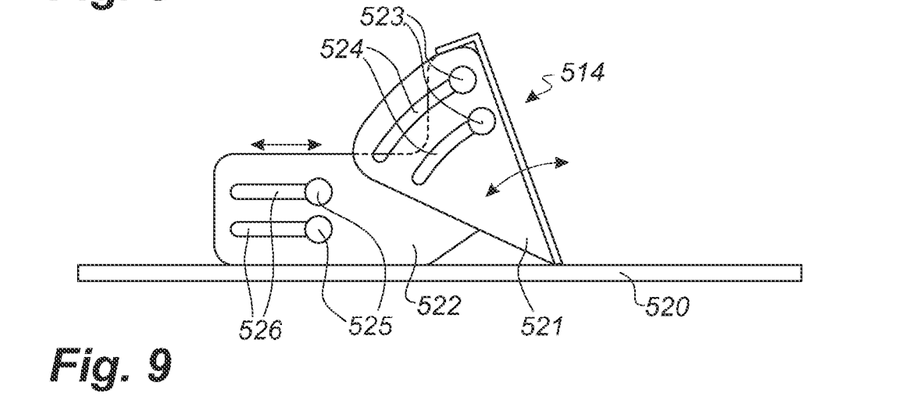
FIG. 9 shows a schematic view of a hinge system for providing a variable external mould plate.

FIG. 9 shows one embodiment for forming a variable moulding plate 514 according to the invention. The moulding plate 514 includes a hinge mechanism comprising a first hinge part 521 and a second hinge part 522. The first hinge part 521 comprises a number of curved slots 524, and the second hinge part 522 comprises a number of pins that engage the curved slots 524 of the first hinge part. Thereby, the relative angle between the two hinge parts 521, 522 may be varied by sliding the pins 523 in the slots, which in turn varies the angle of the moulding plate 514 and in particular the moulding surface of the moulding plate 514.

The second hinge part 522 comprises a number of slots 526, which are oriented parallel to an upper surface of a support table 520. A number of pins 525, which are stationary attached to the support table 520 of the web mould system, engage the slots 526 of the second hinge part, whereby the position of the hinge system and thereby also the moulding plate 514 may be varied relative to the support table 520 and in particular relative to the central portion of the lower web mould part.

The invention has been described with reference to advantageous embodiments. However, the scope of the invention is not limited to the illustrated embodiments, and alterations and modifications can be carried out without deviating from the scope of the invention, which is defined by the claims.

The invention claimed is:

1. A method for manufacturing a wind turbine blade component in form of an I-shaped shear web by use of a shear web mould system, wherein the shear web mould system comprises:
   a central moulding portion for forming at least a part of a web body;
   a first moulding plate for forming at least a part of a first web foot flange; and
   a second moulding plate for forming at least a part of a second web foot flange,
   wherein angles of the first moulding plate and the second moulding plate relative to the central moulding portion are adjustable, and
   wherein the method comprises the steps of:
   a) arranging a fibre-reinforcement material in a mould cavity formed by at least the central moulding portion, the first moulding plate, and the second moulding plate of the shear web mould system, wherein the angles of the first moulding plate and the second moulding plate relative to the central moulding portion are adjusted to respective desired angles prior to the arranging of the fibre-reinforcement material in the mould cavity;
   b) supplying resin to the mould cavity; and
   c) curing or hardening the resin in order to form said wind turbine blade component,
   wherein the desired angles of the first and second moulding plates are maintained throughout the steps of arranging the fibre-reinforcement material in the mould cavity, supplying the resin to the mould cavity, and curing or hardening the resin.

2. The method according to claim 1, wherein step a) comprises the step of arranging a number of fibre layers that cover the first moulding plate, the central moulding portion, and the second moulding plate.

3. The method according to claim 1, further comprising the step of arranging a core material in a central part of a lower web mould part.

4. The method according to claim 1, wherein at least a first insert is arranged at a first end of the central moulding portion, wherein said first insert is adapted to provide a gradual transition from the web body to the first web foot flange.

5. The method according to claim 4, wherein a second insert is arranged at a first end of a lower web part, wherein said second insert is adapted to provide a gradual transition from the web body to the second web foot flange.

6. The method according to claim 1, wherein at least one vacuum bag is arranged on the shear web mould system in order to form the mould cavity.

7. The method according to claim 1, wherein the mould cavity prior to supplying the resin is evacuated by use of a vacuum source.

8. The method according to claim 3, wherein the core material comprises balsawood or a foamed polymer.

* * * * *

UNITED STATES PATENT AND TRADEMARK OFFICE
CERTIFICATE OF CORRECTION

PATENT NO.        : 12,251,892 B2
APPLICATION NO.   : 17/747070
DATED             : March 18, 2025
INVENTOR(S)       : Steven Hauge Pedersen and Kim Ansholm Rasmussen It is certified that error appears in the above-identified patent and that said Letters Patent is hereby corrected as shown below:

On the Title Page

Item (62), in Line 2 of the Related U.S. Application Data, the following should appear as follows: "Division of application No. 15/523,268, filed on Apr. 28, 2017, now abandoned, filed as application No. PCT/EP2014/073382, filed on Oct. 30, 2014."

Signed and Sealed this
Thirteenth Day of May, 2025

Coke Morgan Stewart
*Acting Director of the United States Patent and Trademark Office*